United States Patent [19]

Glover et al.

[11] Patent Number: 4,824,890

[45] Date of Patent: Apr. 25, 1989

[54] FILM FORMING SILICONE MICROEMULSIONS

[75] Inventors: Shedric O. Glover; Daniel Graiver, both of Midland, Mich.

[73] Assignee: Dow Corning Corporation, Midland, Mich.

[21] Appl. No.: 151,666

[22] Filed: Feb. 2, 1988

[51] Int. Cl.$^4$ ............................................. C08K 3/20
[52] U.S. Cl. ..................................... 524/253; 524/606; 524/837
[58] Field of Search .......................... 524/253, 606

[56] References Cited

U.S. PATENT DOCUMENTS

| | | | |
|---|---|---|---|
| 3,433,780 | 3/1969 | Cekada et al. | 524/156 |
| 3,975,294 | 8/1976 | Dumoulin | 252/354 |
| 4,052,331 | 10/1977 | Dumoulin | 252/312 |
| 4,146,499 | 3/1979 | Rosano | 523/336 |
| 4,221,688 | 9/1980 | Johnson et al. | 524/251 |
| 4,228,054 | 10/1980 | Ona et al. | 524/722 |
| 4,620,878 | 11/1986 | Gee | 106/287.15 |

OTHER PUBLICATIONS

U.S. Patent Application Ser. No. 809,090.

*Primary Examiner*—Morton Foelak
*Attorney, Agent, or Firm*—Edward C. Elliott

[57] ABSTRACT

A curable, reinforced polydiorganosiloxane microemulsion is prepared by adding from 5 to 30 parts by weight of colloidal silica per 100 parts by weight of polydiorganosiloxane in the microemulsion and from 1 to 5 parts by weight of dialkyltindicarboxylate catalyst per 100 parts by weight of the microemulsion to polydiorganosiloxane microemulsion. The curable, reinforced polydiorganosiloxane emulsion can be cast into coherent, elastomeric films of less than 0.4 micrometer thickness.

4 Claims, No Drawings

FILM FORMING SILICONE MICROEMULSIONS

BACKGROUND OF THE INVENTION

1. Field of the Invention

This invention relates to the use of silicone microemulsions in the production of extremely thin elastomeric films.

2. Background Information

Stable polymeric emulsions of polydiorganosiloxane have now been developed. Polydiorganosiloxane emulsions having smaller particle sizes have also been developed as taught in U.S. Pat. No. 4,146,499, issued March 27, 1979. This patent describes a unique method for the preparation of oil-in-water microemulsions. including dimethylpolysiloxane oil.

Johnson, Saam, and Schmidt discovered a method of producing a crosslinked polymer in emulsion form that gave an elastomeric film upon removal of the water as revealed in U.S. Pat. No. 4,221,688, issued Sept. 9, 1980.

Ona et al. disclose another method of producing a crosslinked polydiorganosiloxane latex in U.S. Pat. No. 4,228,054 issued Oct. 14, 1980.

In U.S. Pat. No. 4,620,878, issued Nov. 4, 1986, Gee teaches a method of preparing polyorganosiloxane emulsions having average particle size of less than 0.14 micrometers.

U.S. patent application Ser. No. 809,090, filed Dec. 12, 1985, by D. Graiver and O. Tanaka, assigned to the same owner as the instant application, teaches another method of producing microemulsions of polydiorganosiloxane fluids.

None of the above references teach how to make reinforced microemulsions which give a cured elastomeric film upon removal of the water.

SUMMARY OF THE INVENTION

A clear polydiorganosiloxane microemulsion which cures to an elastomer is produced by mixing a polydiorganosiloxane microemulsion, colloidal silica, and dialkyltindicarboxylate catalyst. The polydiorganosiloxane microemulsion is produced by mixing a precursor emulsion of cyclopolydiorganosiloxane, surfactant, and water into a polymerization medium of water and an effective amount of a polymerization catalyst, at rate of addition which is effective to form an emulsion of less than 0.15 micrometer particle size.

DESCRIPTION OF THE INVENTION

This invention relates to a method of producing a polydiorganosiloxane microemulsion capable of giving a coherent. elastomeric film of less than 0.4 micrometer thickness comprising, (A) preparing a microemulsion of polydiorganosiloxane by sequentially adding a precursor emulsion comprised of cyclopolydiorganosiloxane, surfactant, and water to a polymerization medium comprised of water and an effective amount of a polymerization catalyst while mixing wherein the rate of addition of the precursor emulsion is effective to form a clear, stable microemulsion which has polydiorganosiloxane droplets of less than 0.15 micrometer size, and which contains a surfactant to polydiorganosiloxane weight ratio of 0.15 to 0.65, (B) admixing from 5 to 30 parts by weight of colloidal silica per 100 parts by weight of polydiorganosiloxane in the microemulsion and from 1 to 5 parts by weight of dialkltindicarboxylate catalyst per 100 parts by weight of the microemulsion, to yield a stable, clear microemulsion, capable of giving a coherent, elastomeric film of less than 0.4 micrometer thickness upon removal of the water at room temperature. The coherent, elastomeric film is void of cracks and/or filler precipitation.

A microemulsion is an emulsion in which the emulsion particles do not exceed diameters of 0.15 micrometers. Preferred are emulsions having particle diameters of less than 0.1 micrometers with diameters of less than 0.05 most preferred. A microemulsion having particles of this size generally has a solids content of from 20 to 30 percent by weight when prepared. A microemulsion ofthis solids content has a high viscosity. It approaches a non-flowable liquid at rest. If the solids content is greater than 30 percent by weight, it is not possible to properly produce the emulsion.

The polydiorganosiloxane microemulsion can be prepared by following the methods found in U.S. Pat. Nos. 3,433,780, 3,975,294, 4,052,331, 4,146,499, and 4,620,878, all of which are hereby incorporated by reference to show methods of producing microemulsions and the microemulsions so produced.

A microemulsion of polydiorganosiloxane may be prepared by sequentially adding a precursor emulsion comprised of cyclopolydiorganosiloxane, surfactant, and water to a polymerization medium comprised of water and an effective amount of a polymerization catalyst, while mixing, wherein the rate of addition of the precursor emulsion is effective to form a clear, stable microemulsion which has polydiorganosiloxane droplets of less than 0.15 micrometer diameter, and which contains a surfactant to polydiorganosiloxane weight ratio of 0.15 to 0.65. That is, the weight of surfactant divided by the weight of polymer is between 0.15 and 0.65. The precursor emulsion emulsion is added at a rate which allows the emulsion particles to be reduced in size as they are added. If the precursor emulsion is added too fast, the particles will not be reduced in size sufficient to give a clear emulsion. The exact rate is dependent upon the equipment being used.

The curable, reinforced polydiorganosiloxane microemulsion of this invention is obtained by admixing from 5 to 30 parts by weight of colloidal silica per 100 parts by weight of polydiorganosiloxane in the microemulsion and from 1 to 5 parts by weight of dialkyltindicarboxylate catalyst per 100 parts by weight of the microemulsion into the above microemulsion.

The colloidal silica can be an aqueous silica sol having particles ranging from 5 to 50 nanometers in diameter, with the smaller diameters most preferred. The pH of the aqueous sol can vary from acidic to basic, since the microemulsion pH can be adjusted to match that of the silica sol. Preferably the colloidal silica is a colloidal dispersion of colloidal silica in water, such as are obtainable from Nalco Chemical Company, such as Nalco 1115, a dispersion containing 15 weight percent of colloidal silica dispersed in water.

The dialkyltindicarboxylate is one in which the alkyl group is selected from monovalent hydrocarbons having from 1 to 10 carbon atoms, such as butyl and octyl, and the carboxylate can have up to 20 carbon atoms, such as octoate and laurate. Preferably the dialkyltindicarboxylate is dioctyltindilaurate in the form of an emulsion.

The coherent, elastomeric film is produced by diluting the curable, reinforced microemulsion to the desired degree, deairing the emulsion and then carefully casting a coating upon the desired substrate. It is important to keep everything involved clean and bubble free since the films are very thin. After the emulsion is cast into a coating, the coating is allowed to dry and cure. The reinforced microemulsion of this invention produces a cured elastomer film upon the removal of the water from the coating. Coherent films have been produced from emulsions having as low as 1 percent solids when the emulsion was cast into a film. Such a low solids content emulsion gave a film thickness of approximately 0.08 micrometers. Similar emulsions which were macroemulsions did not give coherent films when the solids content was taken to a point below 20 percent solids. A coherent film could not be produced from the macroemulsion having a thickness of less than about 0.4 micrometers.

The coherent elastomeric films produced by the method of this invention are particularly useful as membranes for separations by filtration or for use in the controlled release of volatile materials, such as fragrances.

The following examples are included for illustrative purposes only and should not be construed as limiting the invention which is properly set forth in the appended claims. All parts are parts by weight.

EXAMPLE 1

A macroemulsion was prepared by adding 570 g (31.76 moles) of distilled, deionized water and 30 g (0.861 mole) of dodecylbenzenesulfonic acid into a beaker and mixing until a homogenous solution was obtained. Then 400 g (1.3514 moles) of octamethylcyclotetrasiloxane was added and stirred for thirty minutes. This mixture was then homogenized by passing twice through a single stage laboratory homogenizer to give a macroemulsion.

A microemulsion was then prepared by first adding 539.5 g (29.97 moles) of distilled, deionized water to a reaction flask and adding 110.5 g (0.3171 mole) of dodecylbenzenesulfonic acid, mixing, and heating to a temperature of 90° C. Then 650 g of the macroemulsion prepared above was slowly added, in a dropwise manner, to the reaction flask with stirring via a dropping funnel at a rate which maintained a clear, transparent emulsion. The addition took place over a two to three hour period. Once the addition was complete, the reaction was allowed to continue for 1 hour at which time the flask was cooled and the emulsion pH was adjusted to 9 with 1 molar sodium hydroxide solution. The microemulsion contained 20 percent by weight polymer and had droplet diameters of about 0.05 micrometers.

The curable, reinforced microemulsion of this invention was then produced by mixing 20 g of the above microemulsion with 3 g of a colloidal dispersion having 15 weight percent of colloidal silica (Nalco 1115 from Nalco Chemical Company) and 1 g of 50 percent solids by weight emulsion of dioctyltindilaurate. The catalyzed emulsion was aged for 2 days at room temperature and then used to cast films. There was 11.25 parts silica per 100 parts polymer and 12.5 parts dioctyltindilaurate per 100 parts polymer.

Samples of the curable, reinforced microemulsion were diluted with distilled water to give solids contents of 20, 10, 5, and 1 percent by weight. Each of these emulsions was clear. Each emulsion was then cast on a surface and allowed to dry at room temperature. The resulting films were then evaluated, with the results shown in Table 1.

An emulsion prepared in accordance with U.S. Pat. No. 4,221,688, having an average particle size of about 0.40 micrometers was also diluted to give the same solids contents as above. Each of these emulsions was an opaque white. Each of these emulsions was cast into films and dried, with the results shown in Table 1.

TABLE 1

|  | Percent Solids | | | |
|---|---|---|---|---|
|  | 20 | 10 | 5 | 1 |
| Microemulsion Film Coherency | excellent | excellent | excellent | good |
| Film Thickness, micrometers | 0.36–0.41 | 0.36–0.31 | 0.20–0.25 | 0.08 |
| Macroemulsion* Film Coherency | good, some surface cracking | severe cracks | silica agglomerates | severe silica agglomeration |
| Film Thickness, micrometers | 0.43–0.46 | 0.53–.068 | 0.15–0.18 | 0.03–0.08 |

*Comparative example

That which is claimed is:

1. A method of producing a curable, reinforced polydiorganosiloxane microemulsion capable of giving a clear, coherent, elastomeric film of less than 0.4 micrometer thickness comprising,
   (A) preparing a microemulsion of polydiorganosiloxne by sequentially adding a precursor emulsion comprised of cyclopolydiorganosiloxane, surfactant, and water to a polymerization medium comprised of water and an effective amount of a polymerization catalyst while mixing, wherein the rate of addition of the precursor emulsion is effective to form a clear, stable microemulsion which has polydiorganosiloxane droplets of less than 0.15 micrometer size, and which contains a surfactant to polydiorganosiloxane weight ratio of 0.15 to 0.65,
   (B) admixing from 5 to 30 parts by weight of colloidal silica per 100 parts by weight of polydiorganosiloxane in the microemulsion and from 1 to 5 parts by weight of dialkyltindicarboxylate catalyst per 100 parts by weight of the microemulsion, to yield a stable, clear, microemulsion, capable of giving a coherent, elastomeric film of less than 0.4 micrometer thickness upon removal of the water at room temperature.

2. The method of claim 1 in which the microemulsion droplets of (A) are of less than 0.1 micrometers.

3. The method of claim 2 in which the colloidal silica is in the form of an aqueous silica sol having particles of from about 5 to 50 nanometers in diameter.

4. The method of claim 3 in which the dialkyltindicarboxylate is dioctyltindilaurate in the form of an emulsion.

* * * * *